3,810,951
EXTRACTION PROCESS
Michael D. Riordan, Beacon, and David G. Weetman, Fishkill, N.Y., assignors to Texaco Inc., New York, N.Y.
No Drawing. Filed May 11, 1970, Ser. No. 36,388
Int. Cl. C07c 11/00
U.S. Cl. 260—677 A
2 Claims

ABSTRACT OF THE DISCLOSURE

Objectionable impurities are removed from a paraffin dehydrogenate by extracting with a polar solvent such as N,N-dimethylformamide with the result that an acceptably colored sulfonate product can be prepared from the extracted material.

BACKGROUND OF THE INVENTION

This invention relates to a process for purifying dehydrogenated n-paraffin products which are used as starting materials for making sulfonates.

As is well known, linear paraffins can be converted to linear internal olefins using a variety of catalytic means. The dehydrogenated product usually consists of 5–20% olefins, 95–80% paraffins, and from 3–5% impurities which are probably polyolefinic or aromatic in nature. It is not unlikely to suspect the presence of oxygenated materials (derived from air oxidation) in samples which have been allowed to stand for any length of time. Sulfonation of this dehydrogenated product leads to the formation of sulfonates having an unattractive color—which is undesirable if such sulfonates are to be used as detergents. This invention provides means whereby these impurities, or other undetermined or unspecified species, can be removed from a paraffin dehydrogenate mixture. The invention, which involves extraction of a paraffin dehydrogenate with a polar solvent, N,N-dimethylformamide being preferred, has been shown to have direct application in pretreating a paraffin dehydrogenate prior to sulfonation with sulfur trioxide.

In the practice of the invention, a given volume of paraffin dehydrogenate is repeatedly contacted with greater volumes of the polar solvent at room temperature until all the yellow color of the paraffin dehydrogenate has disappeared and is present in the solvent layer. The actual ratio of the volume of solvent to the volume of dehydrogenate depends on two factors: the degree of discoloration of the dehydrogenate and the number of extractions contemplated. This ratio generally will vary from 0.1 to 10.0 times the volume of the dehydrogenate. The solvent is removed by vacuum distillation or extracted with dilute mineral acid, followed by washing with water and drying over a drying agent. The extract will contain the impurities of the dehydrogenate, and the raffinate comprises the main portion of the dehydrogenate which can be used for making sulfonates.

While N,N-dimethylformamide is the preferred polar solvent for the present process, other solvents such as dimethyl sulfoxide (DMSO) can also be used. Suitable acids for removing small amounts of dimethylformamide solvent from the dehydrogenate are mineral acids in a concentration of 1 to 20%. The preferred acid is a 5% hydrochloric acid solution.

The invention is further illustrated by the following examples:

EXAMPLE I 500 grams of a sample of paraffin dehydrogenate were extracted at room temperature with three 500 ml. portions of N,N-dimethylformamide (DMF). The yellow color initially associated with the paraffin dehydrogenate, was transferred to the DMF layer. The dehydrogenate fractions (484 grams, 97% recovery) were separated from the DMF extract. After distillation of the dehydrogenate to remove residual DMF, 449 grams (90% recovery) were obtained.

The distillation step used to remove DMF can be replaced at this point by an extraction with dilute mineral acid, followed by washing with water and drying over anhydrous magnesium sulfate. In this modification the yield is 80%.

EXAMPLE II

A 250 ml. three necked round bottom flask was fitted with a dropping funnel, condenser equipped with a calcium chloride tube, a thermometer, a cooling bath, and a magnetic stirrer. The flask was charged with 100 ml. of methylene chloride, and the system was cooled to 0° C. Sulfur trioxide (10.3 g., 0.129 mole) was added to the flask, followed by the addition of 1,4-dioxane (11.5 g., 0.131 mole). The temperature after the dioxane addition was 15–20° C. A sample of paraffin dehydrogenate (100 g., 10% total olefin, $C_{12}$–$C_{13}$ mixture) was then added at a fairly rapid rate. After only a few milliliters of the dehydrogenate had been added, the color of the solution became black; further addition gave a more intense blackening. In a similar sulfonation reaction, in which a 15% olefin–85% paraffin mixture (prepared in the laboratory from dodecene and dodecane) was added to the sulfur trioxide-dioxane complex in methylene chloride, this blackening did not occur. The final sulfonated products obtained from the blackened reaction mixture were poorly colored.

EXAMPLE III

Essentially the identical reaction as previously described in Example II was repeated, using an identical sample of paraffin dehydrogenate extracted with N,N-dimethylformamide, and distilled. The addition of the extracted dehydrogenate to the sulfonation mixture gave a clear, pale-yellow solution which was processed to give acceptably colored sulfonates.

EXAMPLE IV

Essentially the identical reaction as previously described in Example II was repeated, using an identical sample of paraffin dehydrogenate that had been stored for one week over freshly dried attapulgus clay. The addition of the dehydrogenate to the sulfonation mixture resulted in extensive solution blackening and, subsequently, poorly colored products.

EXAMPLE V

Essentially the identical reaction as previously described in Example II was repeated using an identical sample of paraffin dehydrogenate which had been chromatographed on silica gel (8:1 ratio). Addition of the dehydrogenate to the sulfonation mixture resulted in extensive blackening of the solution and subsequently poorly colored products.

EXAMPLE VI

Essentially the identical reaction as described in Example I was repeated using an identical sample of paraffin dehydrogenate, which had been divided into four equal-volume fractions by distillation under vacuum. Addition of each fraction to a sulfonation mixture resulted in extensive blackening of the solution and, subsequently, poorly colored products.

The present process finds applicability in particular for the purifying of a paraffin dehydrogenate which is to be sulfonated with sulfur trioxide by the method disclosed and claimed in commonly assigned patent application (D#71,544) filed even day herewith.

As shown in the above examples, similar paraffin dehydrogenate samples which had been untreated, stored over freshly dried attapulgus clay, chromatographed on silica gel, or vacuum distilled, respectively, yielded blackened, poorly colored sulfonates when treated with sulfur trioxide. The blackening, however, did not occcur when an untreated synthetic mixture of dodecene in dodecane was sulfonated by the sulfur trioxide complex indicating that the darkening was undoubtedly due to impurities in the paraffin dehydrogenate.

What is claimed is:

1. A process for purifying a colored paraffin dehydrogenate containing 5 to 20% olefins, 95 to 80% paraffins and from 3 to 5% polyolefinic or aromatic impurities by removing said polyolefinic or aromatic impurities therein which comprises repeatedly contacting said paraffin dehydrogenate at room temperature with 1/10 to 10 times the volume of the dehydrogenate of a solvent of the group of N,N-dimethylformamide and dimethyl sulfoxide until the color thereof has substantially disappeared from the dehydrogenate and said impurities have been absorbed by said solvent and then removing said solvent by extracting with a dilute mineral acid having a concentration of from 1 to 20%.

2. Process according to claim 1 wherein said mineral acid is hydrochloric acid.

References Cited

UNITED STATES PATENTS

| | | | |
|---|---|---|---|
| 3,330,881 | 7/1967 | Higgins | 260—677 |
| 2,963,426 | 12/1960 | Holder | 208—286 |
| 3,197,400 | 7/1965 | Fierce et al. | 208—231 |
| 2,717,879 | 9/1955 | Hodges | 208—263 |
| 3,164,546 | 1/1965 | Millikan et al. | 208—231 |
| 3,058,905 | 10/1962 | Washall | 208—24 |

DELBERT E. GANTZ, Primary Examiner

J. M. NELSON, Assistant Examiner

U.S. Cl. X.R.

208—263, 289